US005704395A

United States Patent [19]
Kim

[11] Patent Number: 5,704,395
[45] Date of Patent: Jan. 6, 1998

[54] SOLENOID VALVE

[75] Inventor: Jung-Bae Kim, Seoul, Rep. of Korea

[73] Assignee: Daewood Electronics Co. Ltd., Seoul, Rep. of Korea

[21] Appl. No.: 705,088

[22] Filed: Aug. 29, 1996

[30] Foreign Application Priority Data

Aug. 31, 1995 [KR] Rep. of Korea ............... 95-27820

[51] Int. Cl.⁶ ..................................... F15B 13/044
[52] U.S. Cl. ......................... 137/625.65; 251/129.21
[58] Field of Search ................. 137/625.65; 251/129.21

[56] References Cited

U.S. PATENT DOCUMENTS

| | | | |
|---|---|---|---|
| 2,886,063 | 5/1959 | Ray | 251/129.21 X |
| 3,022,799 | 2/1962 | Padula | 137/625.65 |
| 3,444,895 | 5/1969 | Schnittker | 137/625.65 |
| 4,932,439 | 6/1990 | Mc Auliffe | 251/129.21 X |
| 4,987,923 | 1/1991 | Tackett | 137/596.17 |

Primary Examiner—Gerald A. Michalsky
Attorney, Agent, or Firm—Beveridge, DeGrandi, Weilacher & Young, LLP

[57] ABSTRACT

A 2-position 3-way solenoid valve provided with one plunger and ports arranged in a half portion of the valve in its longitudinal direction is disclosed. The valve includes a valve body having a base with first and second ports and open and closed ends, a housing being hermetically coupled to the base and having a third port, and a cover for closing an end of the housing, the valve body having a chamber therein. The first and second ports are directly communicated with the chamber, and the third port is communicated with the chamber through a flow passage extending to the cover from the housing. A hollow cylindrical sleeve is disposed within the valve body, extending from the housing to the base. A plunger having balls each fixed at both ends thereof is movably disposed within the chamber. On the circumference of the plunger, a plurality of grooves are formed in its longitudinal direction.

8 Claims, 4 Drawing Sheets

SOLENOID VALVE

BACKGROUND OF THE INVENTION

1. Field of the Invention

The present invention relates to a solenoid valve, and more particularly to a 2-position 3-way solenoid valve provided with one plunger and ports arranged in a half portion of the valve in its longitudinal direction to have a simple structure and excellent assemblage.

2. Description of the Prior Art

FIG. 1 shows a conventional 2-position 3-way solenoid valve for an anti-lock brake system. The solenoid valve includes a core 2 having a flow passage 10 formed to pierce therethrough in its longitudinal direction and an annular solenoid assembly 4 disposed to surround core 2. A plug 6 is threadedly engaged with a base 8 having a piercing flow passage 20 formed in its longitudinal direction and another flow passage 30. Plug 6 provided with base 8 is threadedly engaged with a block 9 including a hydraulic circuit as a part of a hydraulic system. In an inner space defined by core 2, plug 6 and base 8, a plunger 16 provided with two balls 12 and 14 is disposed. Balls 12 and 14 are for opening/closing flow passages 10 and 20 respectively and are fixedly held at both ends of plunger 16. A spring 18 is disposed between plunger 16 and core 2. An end portion of core 2 is inserted into a block 9' including a hydraulic circuit as a part of a hydraulic system. When solenoid assembly 4 is not energized, plunger 16 is biased to base 8 by the resilient force of spring 18, so that ball 14 closes flow passage 20. Accordingly, flow passages 10 and 30 are communicated with each other. When solenoid assembly 4 is energized, plunger 16 is biased to core 2, so that ball 12 closes flow passage 10. Accordingly, flow passages 20 and 30 are communicated with each other.

In the conventional 2-position 3-way solenoid valve as shown in FIG. 1, the flow passage is formed by penetrating the solenoid valve and ports is formed at both ends of a valve body. If the solenoid valve is used to form a hydraulic system, a block is divided into upper and lower blocks to have flow passages fluidly connected to the ports of the solenoid valve. As the result, the structure of the block is complicated to deteriorate its assemblage as well as workability.

On the other hand, a 2-position 3-way solenoid valve has been developed in which the flow passage penetrating the valve is not formed and ports is formed at a longitudinally half portion of a valve body. In the solenoid valve, however, there is a problem that an additional plunger having a ball is required. Besides, the solenoid valve cannot be used in a hydraulic system such as an anti-lock brake system adapted to operate under high pressure over 200 bars as well as having a small orifice in diameter.

SUMMARY OF THE INVENTION

The present invention is devised to solve the foregoing problems. It is an object of the present invention to provide a 2-position 3-way solenoid valve having a simple structure and excellent assemblage.

To achieve the above object of the present invention, there is provided a 2-position 3-way solenoid valve comprising:

a valve body having a hollow cylindrical base with first and second ports and open and closed ends, a hollow cylindrical housing being hermetically coupled to the base and having a third port formed on a side wall thereof adjacent to the base, and a cover hermetically coupled to the housing to close an end of the housing, the valve body having a chamber therein;

a hollow cylindrical sleeve extending to the base from the housing, one end thereof hermetically coupled to the base, the other end thereof hermetically coupled to the cover;

valve means movable within the chamber in a longitudinal direction of the valve body for opening one of the first and third ports and closing the other one thereof in response to electric signal, the valve means being positioned at a first position of closing the first port and opening the third port in a normal state that the electric signal is not applied or at a second position of opening the first port and closing the third port in an active state that the electric signal is applied, whereby the first and second ports are communicated with each other or the second and third ports are communicated with each other; and a solenoid assembly disposed at the circumference of the valve body for generating the driving force of moving the valve means located at the first position in the normal state to the second position in response to the electric signal.

Preferably, the first and second ports are directly communicated with the chamber, the third port is communicated with the chamber through an inner flow passage extending to the housing from the cover, and the port is formed at the center of a closed end of the base.

The valve means may comprise:

a cylindrical plunger having a conical end which faces the first port and being movably disposed within the chamber;

a first ball fixed at the top of the conical end for opening/closing the first port;

a second ball fixed at the other end of the plunger for opening/closing the third port; and a spring disposed between the cover and the other end of the plunger to bias the plunger to the first port.

A plurality of grooves are formed on the circumference of the plunger, whereby the fluid travels smoothly through the grooves.

The cover has a cylindrical protruding portion which is hermetically fitted into the sleeve, and the inner flow passage is communicated with the third port, starting from the center of the protruding portion and passing through the housing.

Preferably, a first nozzle is installed in the first port, and a second nozzle is installed in the inner flow passage of an end of the protruding portion.

Besides, a casing is installed at the circumference of the solenoid assembly and has a flange portion at both ends thereof, the flange portion being for coupling the casing to the valve body by radially pressing the circumference of the flange portion against coupling jaw portions each provided to the housing and the cover.

For example, the base has a coupling jaw portion near the open end thereof, and the housing has a flange portion for coupling the housing to the base by radially pressing the circumference of the flange portion of the housing against the coupling jaw portion of the base.

If a modulator is manufactured by using the solenoid valve according to the present invention, only one block of the modulator includes flow passages which are communicated with each of the ports of the solenoid valve. Accordingly, the structure of the modulator becomes simply and then the workability thereof is improved.

BRIEF DESCRIPTION OF THE DRAWINGS

The above object and other advantages of the present invention will become more apparent by describing in detail preferred embodiment thereof with reference to the attached drawings in which.

DETAILED DESCRIPTION OF THE PREFERRED EMBODIMENT

Figure 1:
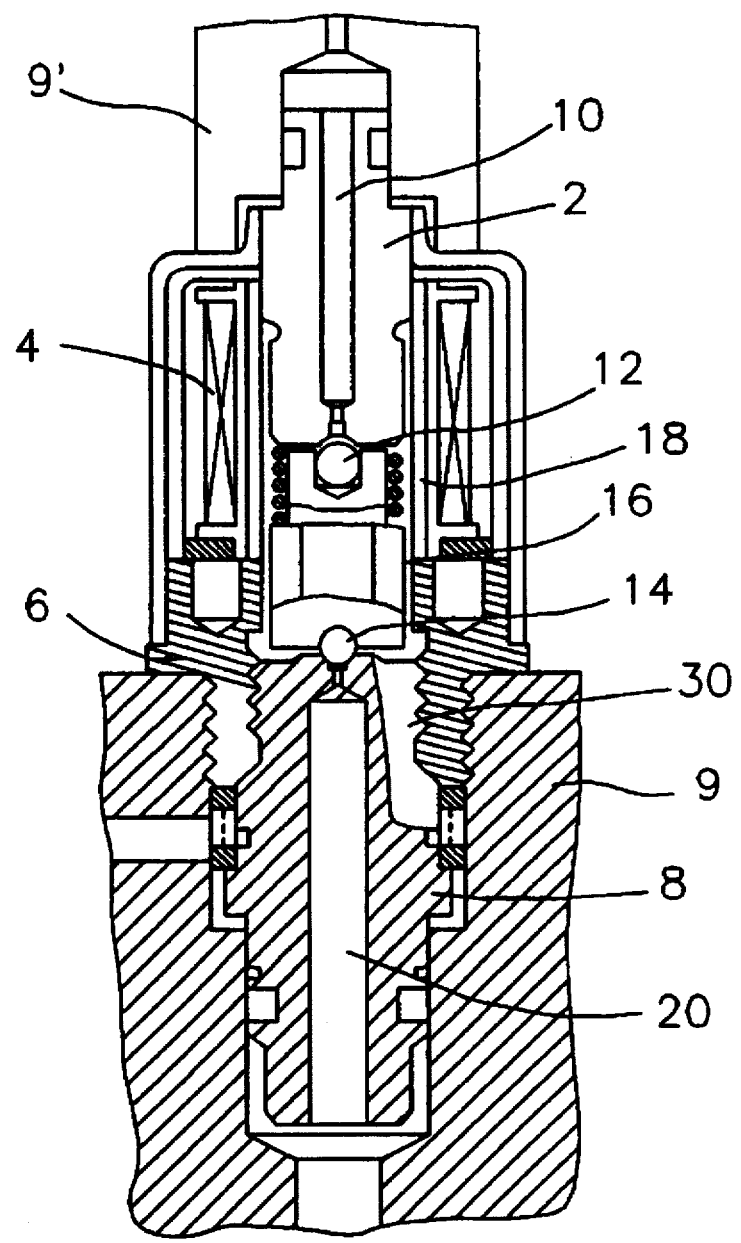
FIG. 1 is a longitudinal sectional view of a conventional 2-position 3-way solenoid valve.

The preferred embodiment of a 2-position 3-way solenoid valve according to the present invention will be described in detail with reference to FIGS. 2 to 5.

The 2-position 3-way solenoid valve according to this embodiment includes a hollow cylindrical housing 50 and a cover 52 hermetically coupled to one end of housing 50. A base 54 is hermetically coupled to the other end of housing 50. Base 54 is a hollow cylinder shape having closed and open ends. As shown, base 54 may be hermetically coupled to housing 50 by fitting a coupling jaw portion 58 of base 54 into a flange portion 60 of housing 50 and radially pressing a circumference of flange portion 60.

First and second ports 62 and 64 are formed at base 54. Preferably, first port 62 is formed at the center of the closed end of base 54. A first nozzle 66 is disposed at first port 62 to communicate the inside of the valve with the outside thereof through a nozzle hole of first nozzle 66.

A hollow cylindrical sleeve 68 extends to base 54 from housing 50, one end of sleeve 68 hermetically coupled to base 54, the other end thereof hermetically coupled to a protruding portion 52a of cover 52. An inner chamber 56 is defined by base 54, sleeve 68 and protruding portion 52a.

Third port 72 is formed at housing 50. Third port 72 is communicated with inner chamber 56 through an inner flow passage 73 extending to housing 50 from cover 52. Preferably, third port 72 is formed near an end portion of housing 50 coupled to base 54 and inner flow passage 73 axially extends from the center of an end of protruding portion 52a. A second nozzle 74 is disposed at the end of protruding portion 52a within inner flow passage 73.

A moveable plunger 70 is provided within inner chamber 54. First and second balls 75 and 76 are protrusively fixed at both ends of plunger 70 by, for example, caulking process. First ball 75 is for opening/closing first nozzle 66 disposed at base 54, and second ball 76 is for opening/closing second nozzle 74 disposed at protruding portion 52a of cover 52. One end of plunger 70 having first ball 75 fixed is shaped to, preferably, a cone, at the top of which first ball 75 is fixed. A step 77 is formed near the other end of plunger 70 to bias plunger 70 to first nozzle 66 by means of a spring 78 of which one end is supported at step 77. The other end of spring 78 is supported at protruding portion 52a of cover 52.

A plurality of grooves 70a for passing the fluid are formed on the outer surface of plunger 70 in its longitudinal direction, so that the traveling of the fluid becomes smooth and the precise movement of plunger 70 is ensured.

An annular solenoid assembly 80 is installed at the circumference of housing 50. A casing 82 is installed at the circumference of solenoid assembly 80. Casing 82 has a flange portion 82a at both ends thereof and is installed by radially pressing a circumference of flange portion 82a against coupling jaw portions 50a and 52b formed at each of housing 50 and cover 52.

Hereinafter, the operation of the solenoid valve according to the present invention will be described.

Figure 2:
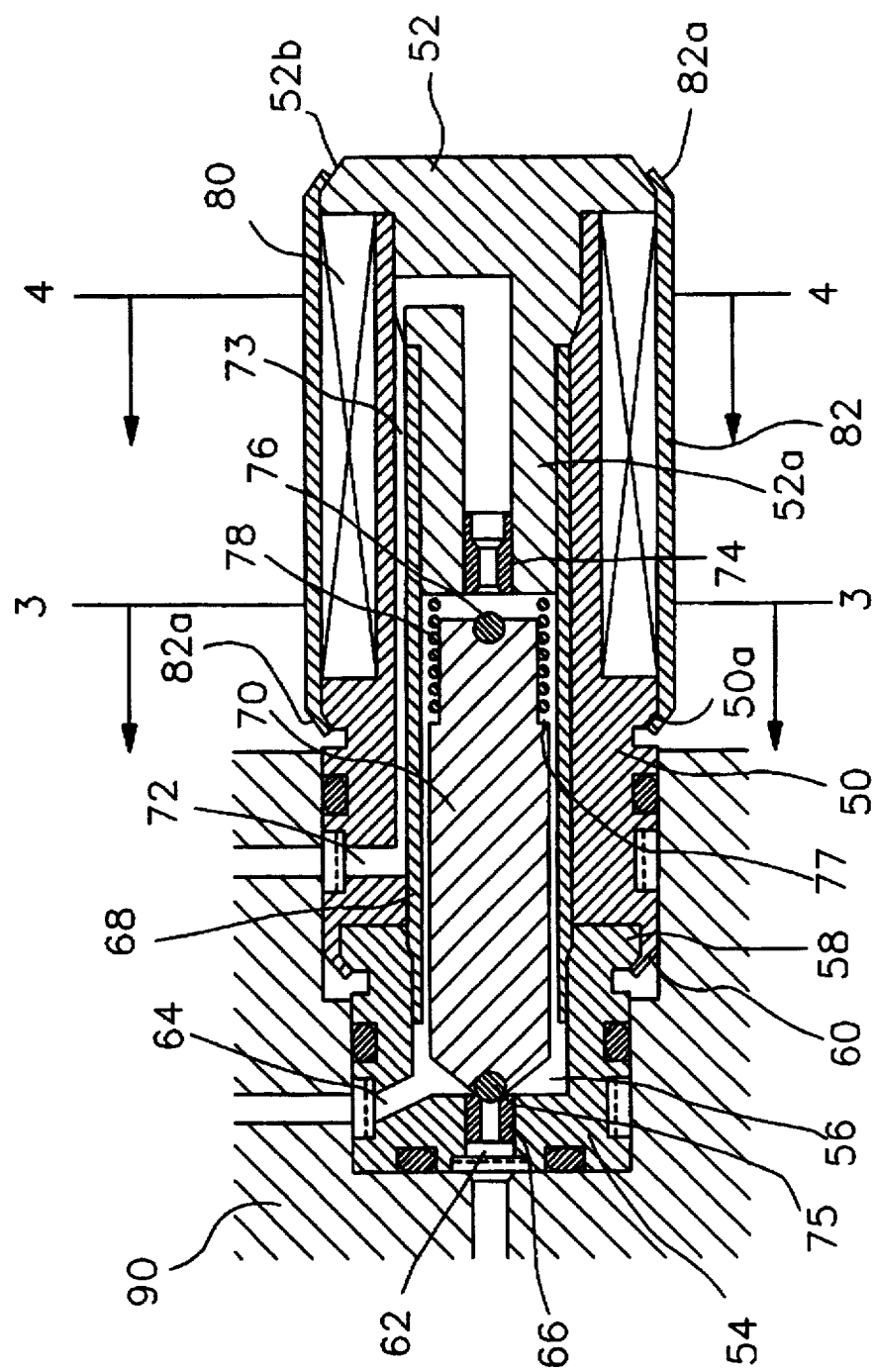
FIG. 2 is a longitudinal sectional view of a 2-position 3-way solenoid valve according to the present invention when a solenoid is not energized.
Figure 3:
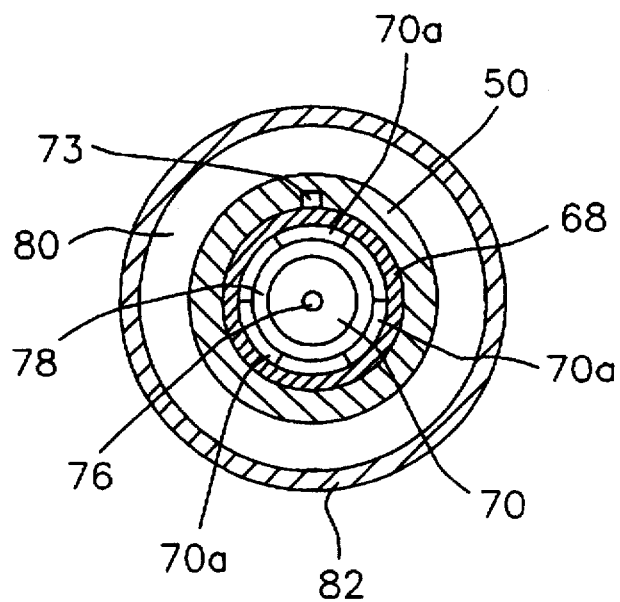
FIG. 3 is a transverse sectional view of the valve according to the present invention taken along lines 3—3 shown in FIG. 2.
Figure 4:
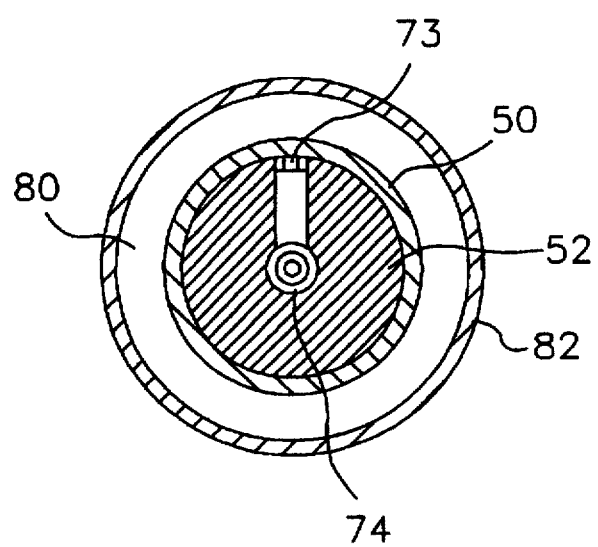
FIG. 4 is a transverse sectional view of the valve according to the present invention taken along lines 4—4 shown in FIG. 2.

When solenoid assembly 80 is not energized, as shown in FIG. 2, plunger 70 is biased to first nozzle 66 by the resilient force of spring 78 and first ball 75 fixed at one end of plunger 70 is seated on first nozzle 66, so that first port is closed. Accordingly, second and third ports 64 and 72 are communicated with each other.

Figure 5:
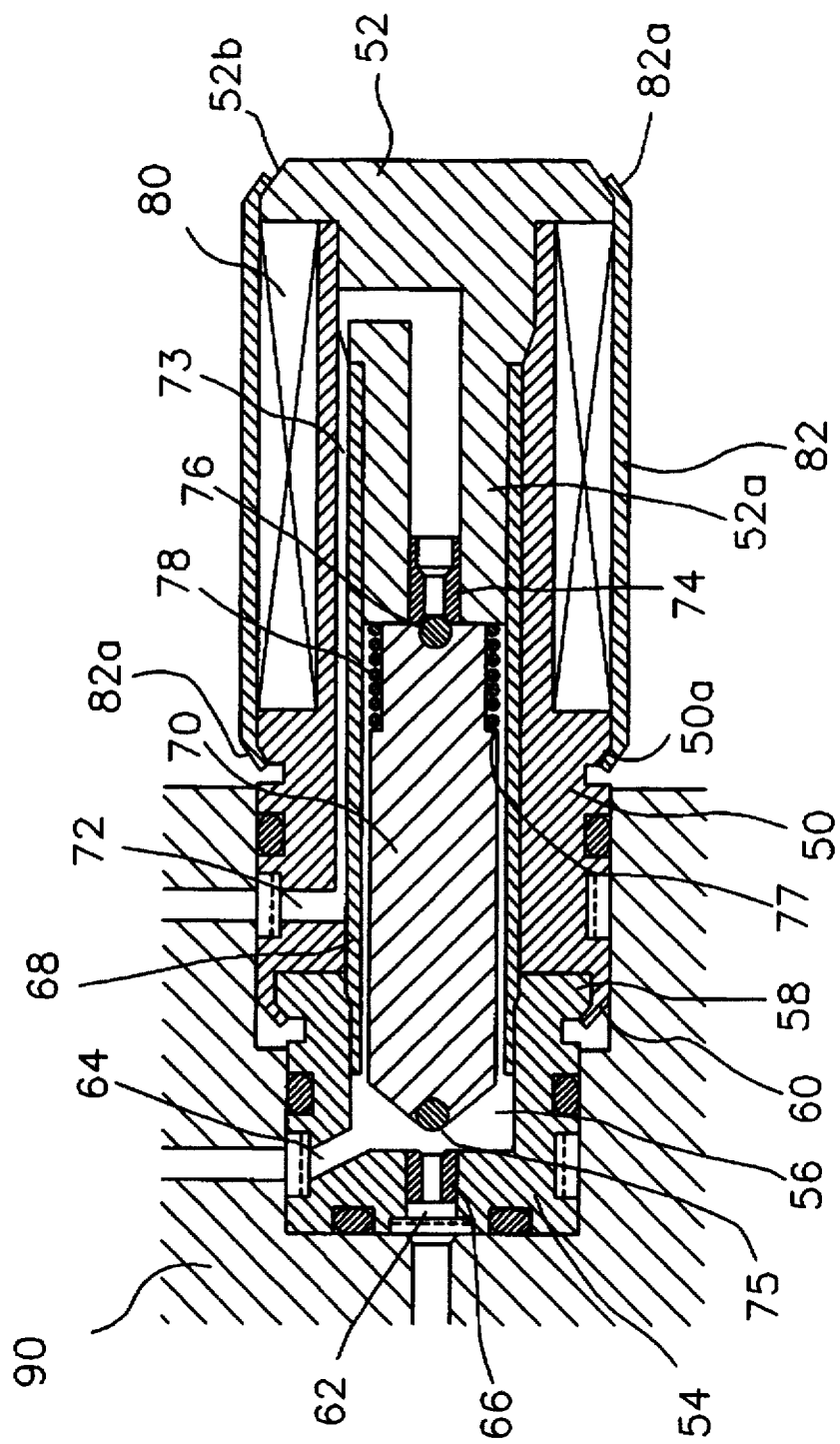
FIG. 5 is a longitudinal sectional view of a 2-position 3-way solenoid valve according to the present invention when a solenoid is energized.

When solenoid assembly 80 is energized, as shown in FIG. 5, plunger 70 is biased to second nozzle 74 by overcoming the resilient force of spring 78 and second ball 76 fixed at the other end of plunger 70 is seated on second nozzle 74, so that third port is closed. Accordingly, first and second ports 62 and 64 are communicated with each other.

Since first to third ports 62, 64 to 72 are formed at a half portion of the valve in its longitudinal direction, as shown in FIGS. 1 and 5, joining of the solenoid valve and block 90 is completed by only inserting the valve into block 90 having the flow passages communicated with the ports of the valve. Therefore, some trouble to use the conventional valve is removed, the trouble that flow passages should be formed at upper and lower blocks and each of them be hermetically coupled to the valve. Generally, O-rings are utilized in order to keep the hermetic state between ports of the valve and filters for removing foreign materials are installed at the ports, respectively.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A solenoid valve comprising:

a valve body having a hollow cylindrical base with first and second ports and open and closed ends, a hollow cylindrical housing being hermetically coupled to said base and having a third port formed on a side wall thereof adjacent to said base, and a cover hermetically coupled to said housing to close an end of said housing, said valve body having a chamber therein;

a hollow cylindrical sleeve extending to said base from said housing, one end thereof hermetically coupled to said base, the other end thereof hermetically coupled to said cover;

valve means movable within said chamber in a longitudinal direction of said valve body for opening one of said first and third ports and closing the other one thereof in response to an electric signal, said valve means being positioned at a first position of closing said first port and opening said third port in a normal state that said electric signal is not applied or at a second position of opening said first port and closing said third port in an active state that said electric signal is applied, whereby said first and second ports are communicated with each other or said second and third ports are communicated with each other; and a solenoid assembly disposed at the circumference of said valve body for generating the driving force of moving said valve means located at said first position in said normal state to said second position in response to said electric signal, wherein said first and second ports are directly communicated with said chamber, said third port is communicated with said chamber through an inner flow passage extending to said housing from said cover, and said first port is formed at a center of a closed end of said base; and wherein said base has a coupling jaw portion near said open end thereof, and said housing has a flange portion for coupling said housing to said base by radially pressing the circumference of said flange portion of said housing against said coupling jaw portion of said base.

2. The solenoid valve as claimed in claim 1, wherein said valve means comprises:

a cylindrical plunger having a conical end which faces said first port and being movably disposed within said chamber;

a first ball fixed at the top of said conical end for opening/closing said first port;

a second ball fixed at the other end of said plunger for opening/closing said third port; and a spring disposed between said cover and the other end of said plunger to bias said plunger to said first port.

3. The solenoid valve as claimed in claim 2, wherein a plurality of grooves are formed on the circumference of said plunger, whereby the fluid travels smoothly through said grooves.

4. The solenoid valve as claimed in claim 1, wherein said cover has a cylindrical protruding portion which is hermetically fitted into said sleeve, and said chamber is defined by said sleeve, said base and said protruding portion of said cover.

5. The solenoid valve as claimed in claim 4, wherein said inner flow passage is communicated with said third port, starting from the center of said protruding portion and passing through said housing.

6. The solenoid valve as claimed in claim 5, wherein a first nozzle is installed in said first port, and a second nozzle is installed in said inner flow passage of an end of said protruding portion.

7. The solenoid valve as claimed in claim 1, wherein a casing is installed at the circumference of said solenoid assembly and has a flange portion at both ends thereof, said flange portion being for coupling said casing to said valve body by radially pressing the circumference of said flange portion against coupling jaw portions each provided to said housing and said cover.

8. A solenoid valve comprising:

a valve body having a hollow cylindrical base with first and second ports and open and closed ends, a hollow cylindrical housing being hermetically coupled to said base and having a third port formed on a side wall thereof adjacent to said base, and a cover hermetically coupled to said housing to close an end of said housing, said valve body having a chamber therein;

a hollow cylindrical sleeve extending to said base from said housing, one end thereof hermetically coupled to said base, the other end thereof hermetically coupled to said cover;

valve means movable within said chamber in a longitudinal direction of said valve body for opening one of said first and third ports and closing the other one thereof in response to electric signal, said valve means being positioned at a first position of closing said first port and opening said third port in a normal state that said electric signal is not applied or at a second position of opening said first port and closing said third port in an active state that said electric signal is applied, whereby said first and second ports are communicated with each other or said second and third ports are communicated with each other; and a solenoid assembly disposed at the circumference of said valve body for generating the driving force of moving said valve means located at said first position in said normal state to said second position in response to said electric signal, wherein said first and second ports are directly communicated with said chamber, said third port is communicated with said chamber through an inner flow passage extending to said housing from said cover, and said first port is formed at a center of a closed end of said base, wherein said valve means comprises:

a cylindrical plunger having a conical end which faces said first port and being movably disposed within said chamber;

a first ball fixed at the top of said conical end for opening/closing said first port;

a second ball fixed at the other end of said plunger for opening/closing said third port; and a spring disposed between said cover and the other end of said plunger to bias said plunger to said first port, wherein a plurality of grooves are formed on the circumference of said plunger, whereby the fluid travels smoothly through said grooves, wherein said cover has a cylindrical protruding portion which is hermetically fitted into said sleeve, and said chamber is defined by said sleeve, said base and said protruding portion of said cover, wherein said inner flow passage is communicated with said third port, starting from the center of said protruding portion and passing through said housing, wherein a first nozzle is installed in said first port, and a second nozzle is installed in said inner flow passage of an end of said protruding portion, wherein a casing is installed at the circumference of said solenoid assembly and has a flange portion at both ends thereof, said flange portion being for coupling said casing to said valve body by radially pressing the circumference of said flange portion against coupling jaw portions each provided to said housing and said cover, wherein said base has a coupling jaw portion near said open end thereof, and said housing has a flange portion for coupling said housing to said base by radially pressing the circumference of said flange portion of said housing against said coupling jaw portion of said base.

* * * * *